United States Patent [19]

Hara

[11] Patent Number: 4,719,564

[45] Date of Patent: Jan. 12, 1988

[54] INTERPRETER LINKAGE SYSTEM FOR LINKING EXTENSION INTERPRETERS TO A BASIC INTERPRETER

[75] Inventor: Takeshi Hara, Tokyo, Japan

[73] Assignee: NEC Corporation, Tokyo, Japan

[21] Appl. No.: 806,480

[22] Filed: Dec. 9, 1985

[30] Foreign Application Priority Data

Dec. 10, 1984 [JP] Japan ............................ 59-260371

[51] Int. Cl.⁴ .............................................. G06Z 9/44
[52] U.S. Cl. ...................................... 364/200; 364/300
[58] Field of Search ... 364/200 MS File, 900 MS File, 364/300

[56] References Cited

U.S. PATENT DOCUMENTS

| | | | |
|---|---|---|---|
| 3,972,026 | 7/1976 | Waitman et al. | 364/900 |
| 4,074,254 | 2/1978 | Belser et al. | 364/900 |
| 4,458,316 | 7/1984 | Fry et al. | 364/200 |
| 4,555,775 | 11/1985 | Pike | 364/900 |
| 4,604,694 | 8/1986 | Hough | 364/300 |
| 4,642,758 | 2/1987 | Teng | 364/200 |

Primary Examiner—Raulfe B. Zache
Assistant Examiner—Thomas C. Lee
Attorney, Agent, or Firm—Schwartz, Jeffery, Schwaab, Mack, Blumenthal & Evans

[57] ABSTRACT

An interpreter linkage system sequentially interprets a plurality of statements constituting a source program written in a programming language in order to sequentially execute them. The system is further capable of arbitrarily adding new statements to an original set of statements by providing sequentially linked extension interpreters capable of interpreting a plurality of specific statements uninterpretable by a basic interpreter. Linkage information relates the basic interpreter to the extension interpreters so that each of the specific statements included in the source program is interpreted by any one of the extension interpreters which are sequentially linked.

3 Claims, 5 Drawing Figures

INTERPRETER LINKAGE SYSTEM FOR LINKING EXTENSION INTERPRETERS TO A BASIC INTERPRETER

BACKGROUND OF THE INVENTION

The present invention relates to an interpreter linkage system.

A prior art interpreter sequentially interprets a plurality of statements constituting a source program written in a programming language such as BASIC language in order to sequentially execute them. However, the prior art interpreter is not provided with a function for arbitrarily adding new statements to a original set of statements. The prior art interpreter is, for instance, available from NEC Corporation under the trade name $N_{88}$-BASIC interpreter.

An object of the present invention is, therefore, to provide a novel interpreter linkage system free from the above-mentioned disadvantage of the prior art interpreter.

SUMMARY OF THE INVENTION

According to an aspect of the invention, there is provided an interpreter linkage system which comprises: memory means; a basic interpreter for interpreting and executing statements of a source program memorized in said memory means; a first through an N-th (a positive integer) extension interpreters capable of interpreting a plurality of specific statements uninterpretable by said basic interpreter; first linkage information storage means for storing information indicating a linkage relationship between said basic interpreter and said N-th extension interpreter; and second linkage information storage means for storing information indicating a linkage relationship between said i-th [i being an integer not smaller than two and not greater than (N−1)] and the (i−1)-th extension interpreters, so that each of said specific statements included in said source program is interpreted by any one of said extension interpreters which are sequentially linked.

BRIEF DESCRIPTION OF THE DRAWINGS

The features and advantages of the present invention will become apparent from the following description when taken in conjunction with the accompanying drawings in which.

In the drawings, the same reference numerals represent the same structural elements.

DETAILED DESCRIPTION OF A PREFERRED EMBODIMENT

Figure 1:
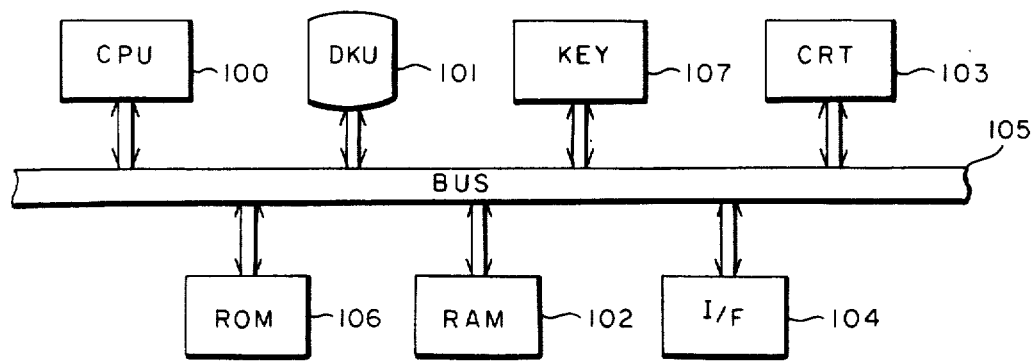
FIG. 1 is a block diagram of a preferred embodiment of the present invention.

Referring to FIG. 1, a preferred embodiment of the present invention comprises a central processing unit (CPU) 100, a disk unit (DKU) 101, a random access memory (RAM) 102, a cathode ray tube display unit (CRT) 103, a keyboard 107, an extension interface unit 104 for use in connecting input/output units or the like, a read only memory (ROM) 106, and a common bus 105 including an address bus, a data bus and a control bus, to which the foregoing structural elements are commonly connected. On a disk medium in the DKU 101 are memorized in advance a basic interpreter and at least one extension interpreter. The CPU 100 is capable of performing a predetermined processing operation under the control of these interpreters, as mentioned later.

Figure 2:
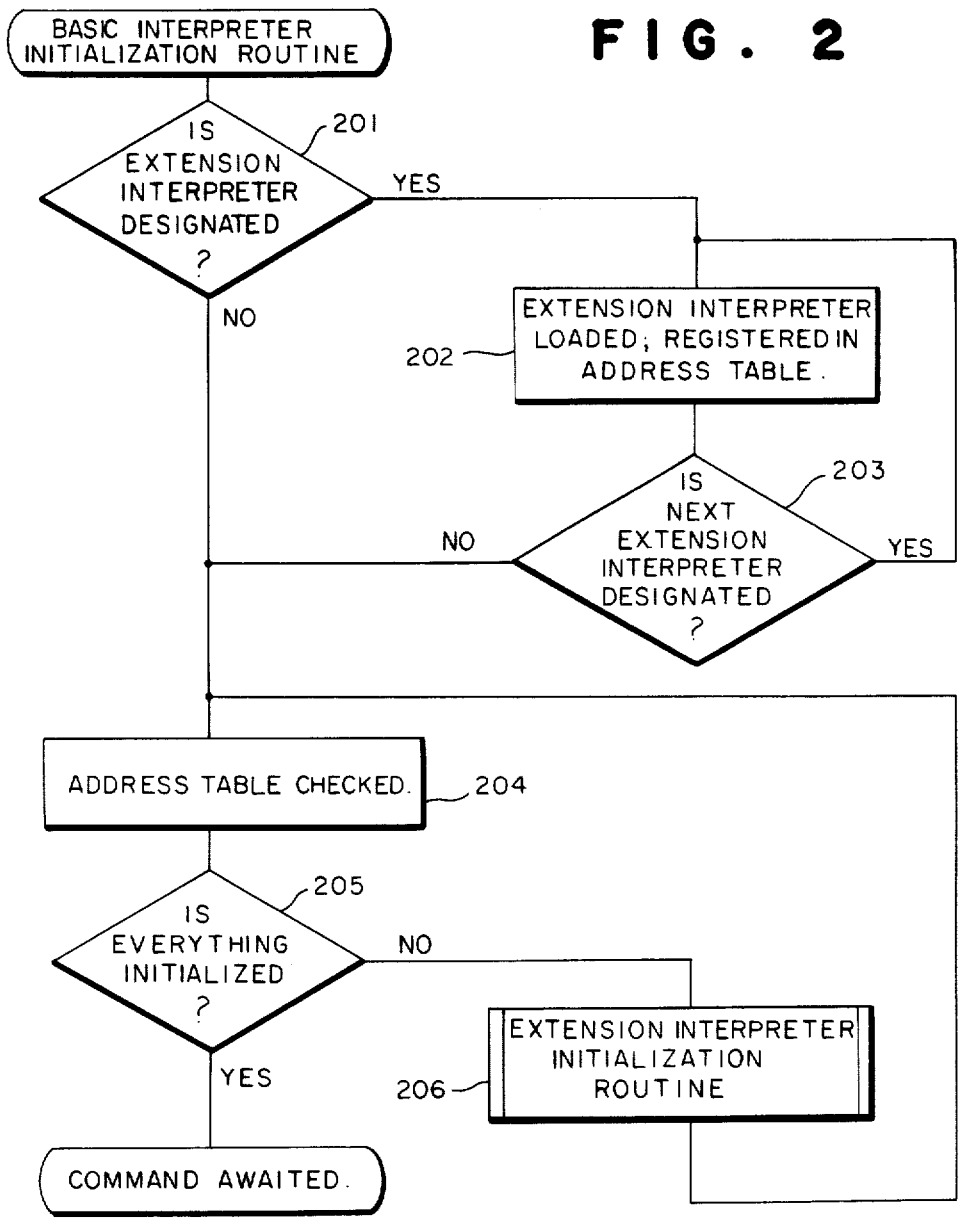
FIG. 2 shows a flow chart for illustrating an initialization routine of a basic interpreter.

A first command is first given by way of the keyboard 107. In response to the first command, the CPU 100, under the control of an operating system (OS) stored in the ROM 106, reads the basic interpreter from the DKU 101 into a storage area within the RAM 102 through the bus 105. An initialization routine of the basic interpreter is then started by the OS to perform a process illustrated in FIG. 2. In FIG. 2, if the first command designates the linkage of the basic interpreter and one or more extension interpreters (step 201), the initialization routine performs the loading of the first extension interpreter from the DKU 101 into a storage area within the RAM 102 specified by the OS through the bus 105 (step 202). Further, during the loading process of the first extension interpreter into the RAM 102, the head address of the first extension interpreter is registered in an extension interpreter address table provided in a predetermined storage area within the RAM 102 ranging addresses B1 to B2 (step 202). Next, the OS performs the checking of whether or not any other extension interpreter is designated by the first command, and if any is, the step 202 will be executed again or, if not, the basic interpreter will check each entry in the address table (step 204). In the step 204, the basic interpreter calls the first extension interpreter stored in a storage area ranging addresses A1 to A2 of the RAM 102 in response to the head address A1 registered in the first entry in the address table to deliver the control to it (step 206). In the first extension interpreter thus called, the initialization routine is started.

Figure 3:
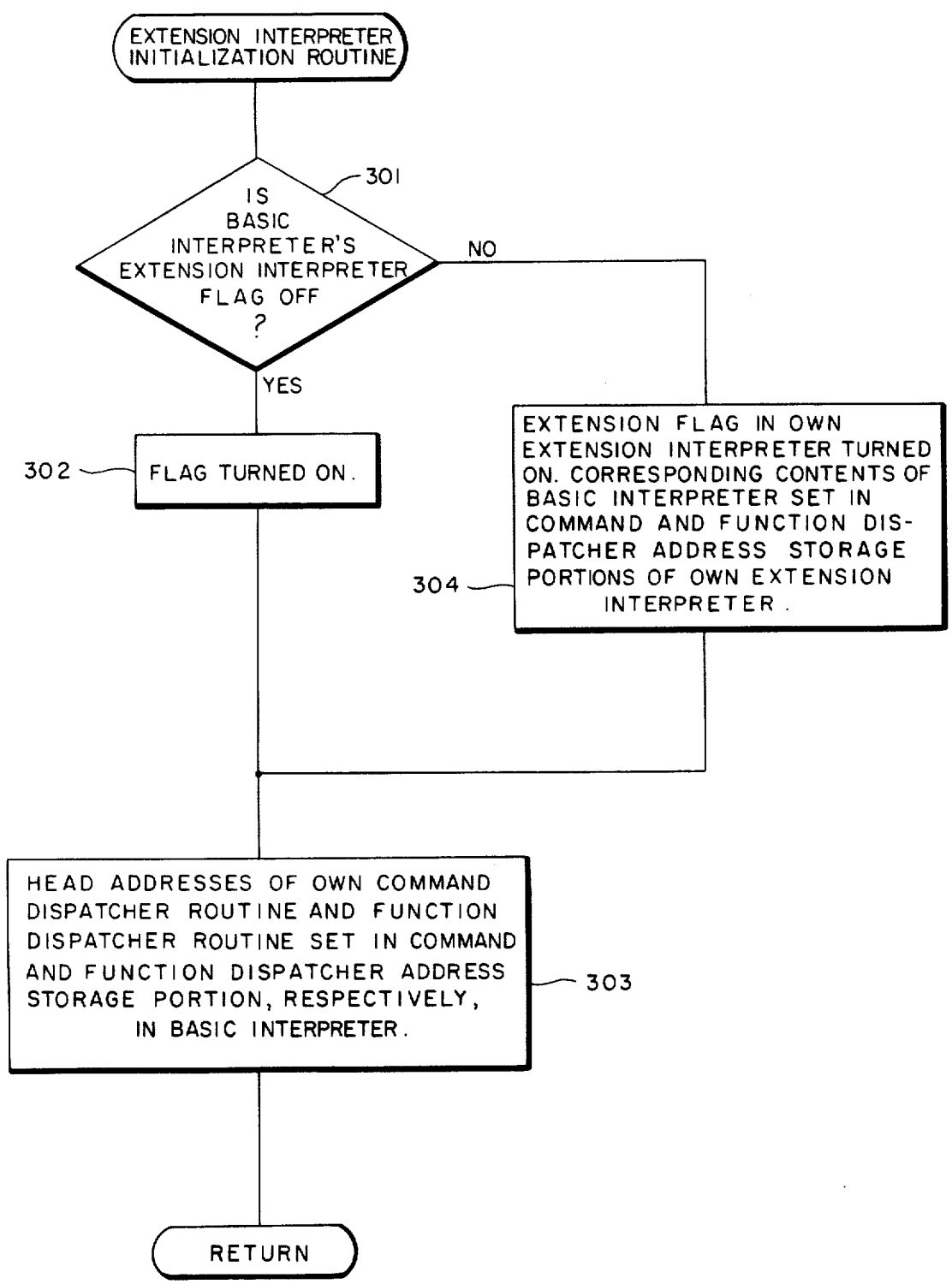
FIG. 3 shows a flow chart for illustrating an initialization routine of extension interpreters.

Referring now to FIG. 3, the initialization routine first checks whether an extension flag provided in the basic interpreter indicates an ON state or an OFF state (step 301) and, if it assumes the OFF state, will turn it into the ON state (step 302). Then, the first extension interpreter sets the head address b1 of its own command-dispatcher (CD) routine to a command-dispatcher-address-storage (CDAS) portion within the basic interpreter and, at the same time, sets the head address C1 of its own function-dispatcher (FD) routine to the function-dispatcher-address-storage (FDAS) portion within the basic interpreter (step 303). After this, the control is returned to the basic interpreter. In response to the return of the control, the basic interpreter next checks the second entry in the address table (step 204) to call the second extension interpreter stored in addresses A3 to A4 in response to the head address A3 registered in this entry. In a similar manner to that mentioned above, the initialization routine of the second extension interpreter thus called is started. The initialization routine executes the following processing because the extension flag within the basic interpreter is already in the ON state. Namely, an extension flag provided in the first extension interpreter is turned into the ON state. Here, the extension flag in each extension interpreter indicates the OFF state immediately after its loading from the DKU 101. Then, the second extension interpreter sets the contents (b1) and (c1) of the CDAS portion and FDAS portion, both provided within the basic interpreter, to its own CDAS portion and FDAS portion, respectively (step 304). Further, the second extension interpreter, after setting the head address b2 of its own CD routine and the head address C2 of its own FD routine to the CDAS portion and the FDAS portion, both of which are provided within the basic interpreter (step 303), returns the control to the basic interpreter. The processing described above is repeated for all the remaining head addresses registered in the address table. Thus is completed the processing of the initialization routine of the basic interpreter.

Figure 4:
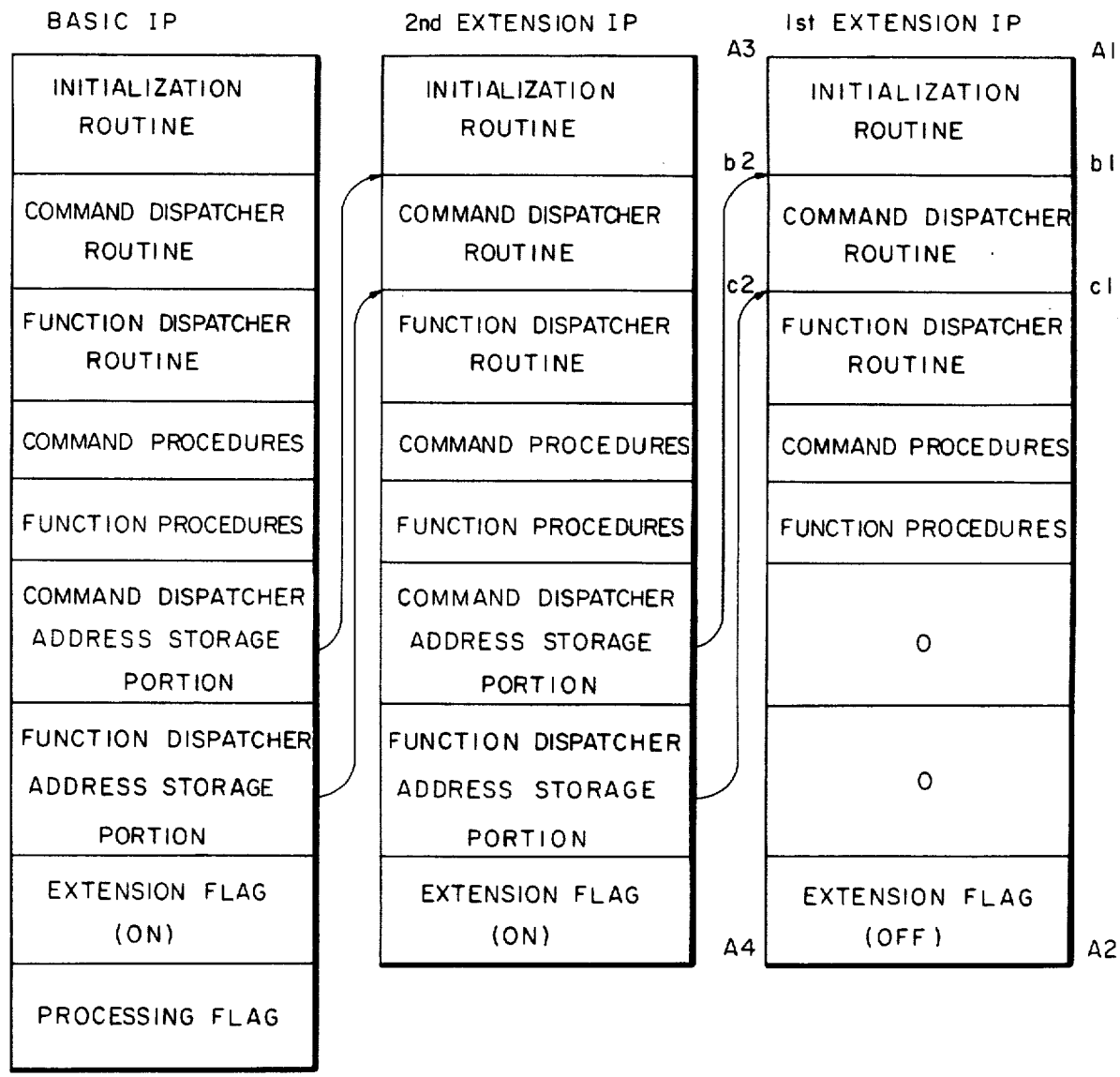
FIG. 4 is a diagram for illustrating a linkage relationship between the basic interpreter and the extension interpreters.

Next will be described the processing that will take place in the execution of a user program when, as in the above-mentioned case, the first and second extension interpreters are linked. The linkage relationship between the basic interpreter and the first and second extension interpreters in this case is illustrated in FIG. 4. Now it is assumed that a user program consisting of a plurality of statements is stored in a suitable storage area within the RAM 102.

Figure 5:
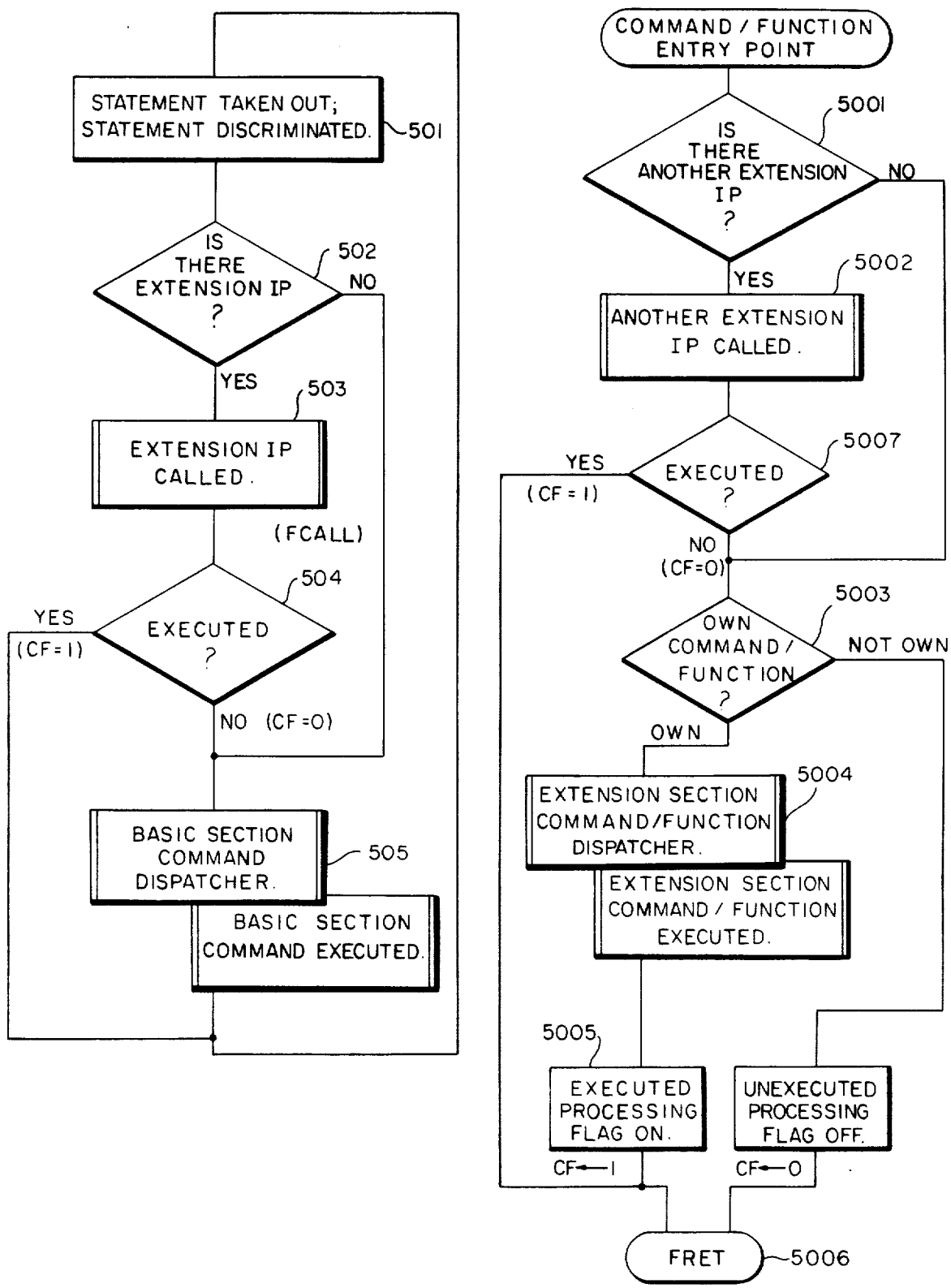
FIG. 5 shows a flow chart for illustrating the processing sequence for each statement of a source program.

Referring to FIG. 5, a dispatcher routine of the basic interpreter first takes out the first statement of this user program to determine whether this statement is a command statement or a function statement (step 501). Then, the dispatcher routine checks its own extension flag (step 502). If the flag assumes the ON state and the taken-out statement assumes a command statement, the dispatcher routine will call a CD routine of the second extension interpreter in response to the head address b2 stored in its own CDAS portion (step 503). The CD routine thus called checks the extension flag within the extension interpreter to which the CD routine belongs (step 5001) and, if the flag is in the ON state, will call a CD routine of the first extension interpreter in response to the head address b1 stored in its own CDAS portion (step 5002). The CD routine of the first extension interpreter checks its own extension flag (step 5001). If the flag assumes the OFF state, the CD routine will decide whether to need the processing of the command statement for itself (step 5003). If the CD routine decides it should, it will process the command statement by a corresponding one of command procedures in the first extension dispatcher (step 5004), and set a processing flag provided in the basic interpreter in the ON state (step 5005). After that, the CD routine delivers the control to the CD routine of the second extension interpreter (step 5006). On the other hand, if the CD routine of the first extension interpreter decides not to need the processing of the command statement for itself, it will deliver the control to the CD routine of the second extension interpreter (step 5006). In response to this, the CD routine of the second extension interpreter checks the processing flag (step 5007) and, if this flag assumes the ON state, it delivers the control to a CD routine of the basic interpreter (step 5006). If the processing flag is in the OFF state, the CD routine of the second extension interpreter will decide whether to need the processing of the command statement for itself (step 5003). If the CD routine decides it should, it will process the command statement (step 5004) and, after setting the processing flag at the ON state (step 5005), deliver the control to the CD routine of the basic interpreter (step 5006). If the CD routine decides it should not, it will deliver the control to the CD routine of the basic interpreter (step 5006). The CD routine of the basic interpreter checks the processing flag (step 504) and, if this flag is in the ON state, will take out the next statement of the user program. On the other hand, if this flag is in the OFF state, after processing the command statement (step 505), the CD routine of the basic interpreter will take out the next statement of the user program. If the statement taken out is a function statement, the same processing as the foregoing will take place except that the FD routines are called in response to the head addresses stored in the FDAS portions, respectively.

Although the CDAS portion, the FDAS portion and the extension interpreter flag are provided in each corresponding interpreter in the preferred embodiment, they may as well be positioned in other storage areas within the RAM 102. Though each interpreter is loaded from the DKU here, it may be provided by an ROM.

While this invention has been described in conjunction with the preferred embodiment thereof, it will now readily be possible for those skilled in the art to put this invention into practice in various other manners.

What is claimed is:

1. An interpreter linkage system comprising:
   a bus;
   first memory means connected to said bus for memorizing an operating system, a user program and a basic interpreter for interpreting and executing statements constituting said user program;
   second memory means connected to said bus for memorizing at least one extension interpreter; and
   processing means connected to said bus and operative before execution of said user program for performing:
   a first processing, under the control of said operating system, for loading at least one storage area of said first memory means with said at least one extension interpreter, and for delivering control to said basic interpreter;
   a second processing, under the control of said basic interpreter, for delivering control to one of said at least one extension interpreter, which is not linked directly or indirectly to said basic interpreter;
   a third processing, under the control of said one extension interpreter having received control from said second processing, for memorizing the content of a first address storage portion provided in one of said first and second memory means into a second storage portion provided in said one extension interpreter, for supplying said first address storage portion with a start address of the extension interpreter, from which an interpreting processing is to be started during execution of said user program, in order to link the extension interpreter to said basic interpreter; and
   a fourth processing for repeating said second and third processings until all of said extension interpreters are linked to said basic interpreter.

2. An interpreter linkage system as claimed in claim 1, herein said basic interpreter takes out, during executing aid source program, said statements to be executed from aid source program one by one.

3. A method of linking each of at least one extension interpreters to a basic interpreter in an interpreter linkage system having a bus; first memory means connected to said bus for memorizing an operating system, a user program and a basic interpreter for interpreting and executing statements constituting said user program; second memory means connected to said bus for memorizing at least one extension interpreter, and processing means, connected to said bus, said method comprising the steps, performed prior to execution of said user program, of:
- (a) loading, under the control of said operating system, at least one storage area of said first memory means with said at least one extension interpreter, and delivering control to said basic interpreter;
- (b) delivering, under the control of said basic interpreter, control to one of said at least one extension interpreters, which is not linked directly or indirectly to said basic interpreter;
- (c) memorizing, under control of said one extension interpreter, the content of a first address storage portion provided in one of said first and second memory means into a second storage portion provided in said one extension interpreter, and supplying said first address storage portion with a start address of the extension interpreter, from which an interpreting processing is to be started during execution of said user program, so as to link the extension interpreter to said basic interpreter; and
- (d) repeating steps (b) and (c) until all of said extension interpreters are linked to said basic interpreter.

* * * * *